United States Patent
Bergo et al.

(10) Patent No.: US 6,944,511 B2
(45) Date of Patent: Sep. 13, 2005

(54) METHOD OF CONTROLLING AN AUTOMATIC MACHINE

(75) Inventors: Daniele Bergo, Bologna (IT); Mario Spatafora, Bologna (IT)

(73) Assignee: G.D Societa per Azioni, Bologna (IT)

( * ) Notice: Subject to any disclaimer, the term of this patent is extended or adjusted under 35 U.S.C. 154(b) by 206 days.

(21) Appl. No.: 10/156,688

(22) Filed: May 28, 2002

(65) Prior Publication Data

US 2002/0198605 A1 Dec. 26, 2002

(30) Foreign Application Priority Data

May 30, 2001 (IT) .................................... BO2001A0347
Jun. 15, 2001 (IT) .................................... BO2001A0378

(51) Int. Cl.[7] .......................... G06F 19/00; A24C 5/32; A24C 5/34
(52) U.S. Cl. ........................................ 700/95; 131/280
(58) Field of Search ........................... 131/280, 67–69; 700/90, 95, 117

(56) References Cited

U.S. PATENT DOCUMENTS

| | | | |
|---|---|---|---|
| 3,722,172 A | | 3/1973 | Seragnoli |
| 3,874,391 A | * | 4/1975 | Dogl et al. ................. 131/280 |
| 4,220,847 A | * | 9/1980 | Focke et al. ................ 219/388 |
| 4,280,187 A | * | 7/1981 | Reuland et al. .............. 702/82 |
| 4,830,176 A | * | 5/1989 | Hierons .................... 198/502.2 |
| 5,116,298 A | * | 5/1992 | Bondanelli et al. ............ 493/4 |
| 5,582,192 A | * | 12/1996 | Williams, III .............. 131/280 |
| 5,727,367 A | | 3/1998 | Cahill et al. |
| 5,735,293 A | * | 4/1998 | Coniglio et al. ............. 131/68 |
| 5,968,293 A | | 10/1999 | Giannini et al. |
| 6,029,485 A | | 2/2000 | Böhmer |
| 6,098,372 A | | 8/2000 | Focke |
| 6,266,989 B1 | | 7/2001 | Pohl et al. |

FOREIGN PATENT DOCUMENTS

| | | |
|---|---|---|
| EP | 1 002 727 | 5/2000 |
| EP | 1 020 357 | 7/2000 |
| EP | 1 038 602 | 9/2000 |

* cited by examiner

*Primary Examiner*—Albert W. Paladini
*Assistant Examiner*—Ryan Jarrett
(74) *Attorney, Agent, or Firm*—Ladas & Parry (57) ABSTRACT

A method and unit for controlling an automatic machine having a number of operating devices located along a production line for producing a succession of articles; at least one operating device having an adjustable work member, which operates in a repetitive work cycle and can be set to a number of different operating configurations to adjust the way in which it interacts with the production process of the articles; upon a command being received during normal operation of the automatic machine, the operating configuration of the adjustable work member is adjusted as the adjustable work member performs a work cycle to process an article.

34 Claims, 3 Drawing Sheets

METHOD OF CONTROLLING AN AUTOMATIC MACHINE

The present invention relates to a method of controlling an automatic machine.

The present invention may be applied to particular advantage on an automatic cigarette packing machine, to which the following description refers purely by way of example.

BACKGROUND OF THE INVENTION

To increase production plant efficiency, cigarette manufacturers require increasingly high-output automatic machines, in particular, cigarette manufacturing and packing machines.

At present, two solutions are adopted to increase the output of cigarette packing machines: increase operating speed, or double the operating members to process the cigarettes on two side by side lines; both of which involve considerable expenditure by calling for major structural alterations to known packing machines.

For example, U.S. Pat. No. 5,085,229 discloses an automatic machine comprising at least an operating device located along a production line for producing articles and a control unit for controlling the operating device in order to obtain a relatively high production rate without substantial loss of quality of the articles produced. The operating device has an adjustable work member, which can be set to a number of different operating configurations to adjust, to a greater or lesser degree, the way in which it interacts with the processing of the articles. A change of the operating configuration of the work member results in a change of one of the characteristics of the articles.

The machine disclosed in U.S. Pat. No. 5,085,229, though relatively reliable, does not allow relatively easy and fast changes of the operating configuration of the work member.

SUMMARY OF THE INVENTION

It is an object of the present invention to provide a method of controlling an automatic machine, designed to eliminate the aforementioned drawbacks and which at the same time is cheap and easy to implement.

According to the present invention, there is provided a method of controlling an automatic machine comprising a number of operating devices located along a production line for producing a succession of articles; at least one operating device comprising an adjustable work member, which operates in a continually repeated work cycle and can be set to a number of different operating configurations to adjust a first characteristic of said articles; a command to adjust said first characteristic being received during normal operation of the automatic machine; the operating configuration of said adjustable work member being adjusted so as to adjust said first characteristic of the articles as the adjustable work member performs a work cycle to process an article.

The present invention also relates to a unit for controlling an automatic machine.

According to the present invention, there is provided a unit for controlling an automatic machine comprising a number of operating devices located along a production line for producing a succession of articles; at least one operating device comprising an adjustable work member, which operates in a continually repeated work cycle and can be set to a number of different operating configurations to adjust a first characteristic of said articles; an interface device for receiving, during normal operation of the automatic machine, a command to adjust said first characteristic; and an adjusting device for adjusting the operating configuration of said adjustable work member to adjust said first characteristic of the articles as the adjustable work member performs a work cycle to process an article.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
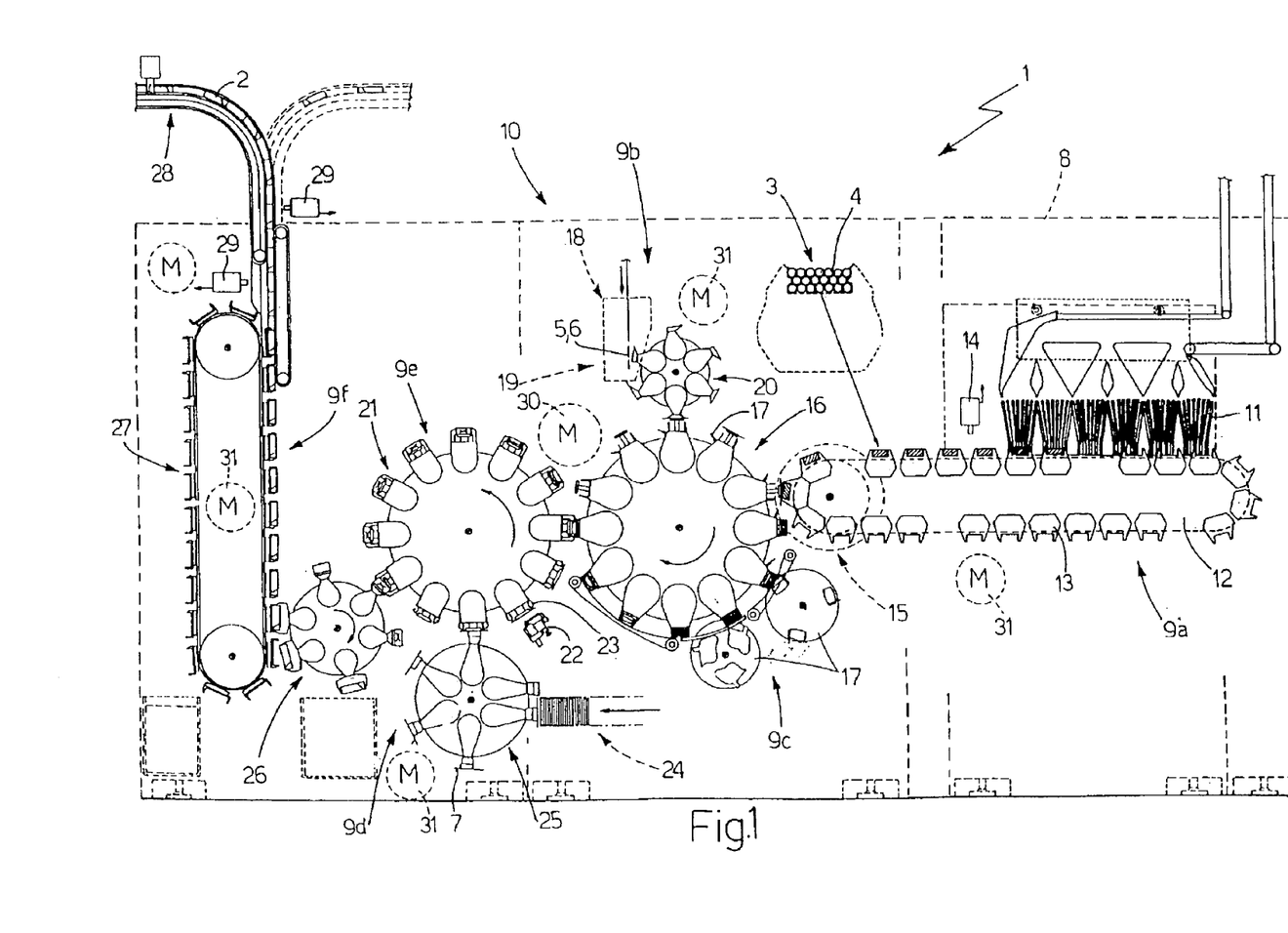
FIG. 1 shows a schematic front view of an automatic cigarette packing machine in accordance with the present invention.

Number 1 in FIG. 1 indicates as a whole an automatic machine for producing rigid, hinged-lid packets 2 of cigarettes, each of which comprises an orderly group 3 of cigarettes 4 enclosed in a sheet 5 of foil packing material, a collar 6 about group 3 and over sheet 5 of packing material, and a blank 7 folded about group 3.

Machine 1 is a substantially known type, and comprises a frame 8 shown by the dash line in FIG. 1 and which supports a number of work stations 9 arranged along a production line, and each having a number of operating devices 10. More specifically, machine 1 comprises six work stations 9: a station 9a for forming groups 3 of cigarettes 4; a station 9b for supplying sheets 5 of foil packing material and collars 6; a station 9c for folding sheets 5 of packing material and collars 6 about respective groups 3; a station 9d for supplying blanks 7; a station 9e for folding blanks 7 about respective groups 3 (and over sheets 5 of packing material and collars 6); and a station 9f for drying packets 2.

The following is a description, by way of example, of the main operating devices 10 of each work station 9, as shown in FIG. 1, though, obviously, each work station 9 normally also comprises other operating devices 10 (in particular, control sensors) which, for the sake of simplicity, are not detailed in FIG. 1.

Station 9a for forming groups 3 of cigarettes 4 comprises a hopper for supplying cigarettes 4; a conveyor 12 with trains of pockets 13, each for receiving a respective group 3 of cigarettes 4; optical control devices 14; and a transfer wheel 15.

Station 9c for folding sheets 5 of packing material and collars 6 about respective groups 3 comprises a packing wheel 16, which receives groups 3 from transfer wheel 15; and a number of folding members 17 carried by or outside wheel 16.

Station 9b for supplying sheets 5 of foil packing material and collars 6 comprises a conveyor 18; a cutting device 19; and a supply wheel 20 for feeding sheets 5 of packing material and collars 6 together to packing wheel 16.

Station 9e for folding blanks 7 about respective groups 3 (and over sheets 5 of packing material and collars 6) comprises a packing wheel 21, which receives groups 3 from packing wheel 16; a gumming device 22; and a number of folding members 23 carried by wheel 21.

Station 9d for supplying blanks 7 comprises a horizontal store 24 for blanks 7; and a supply wheel 25 for feeding blanks 7 to packing wheel 21.

Station 9f for drying packets 2 comprises a transfer and reject wheel 26; a drying conveyor 27; a gumming device (not shown); an output conveyor 28; and optical control devices 29.

Machine 1 also comprises a main electric motor 30 for powering packing wheels 16 and 21 (with relative folding members 17 and 23) and transfer wheels 15 and 26; and a number of secondary electric motors 31 for powering conveyor 12, supply wheels 20 and 25, drying conveyor 27, and output conveyor 28.

Machine 1 has a control unit 32 (shown in FIG. 2), which is housed in a cabinet 33, is connected to packing machine 1 by electric cables (not shown), and has a user interface (so-called HMI) device 34 for interfacing with the operator. More specifically, user interface device 34 comprises a known industrial computer having a data display screen 35, and a type-in device 36 normally defined by a keyboard and/or pointing device. Alternatively, type-in device 36 may be integrated in screen 35 by means of a so-called "touchscreen" function.

Figure 2:
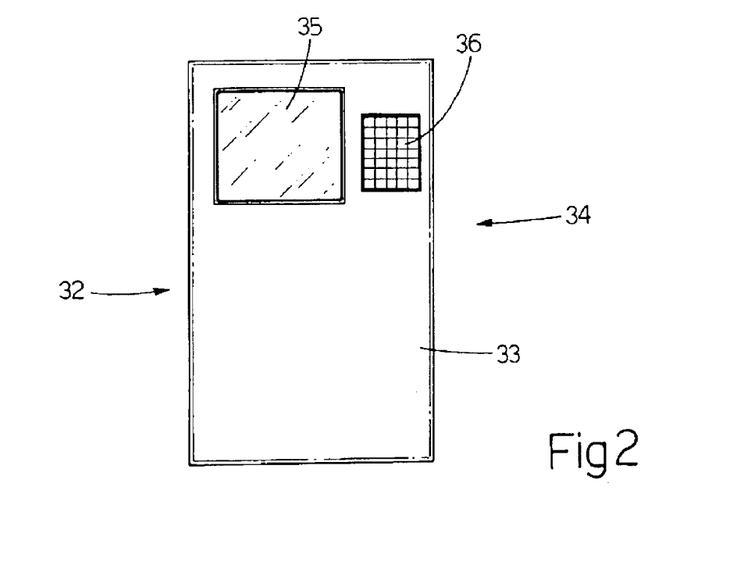
FIG. 2 shows a schematic view of a control unit for controlling the FIG. 1 automatic machine.

In a preferred embodiment, control unit 32 has a network connection, typically operating to the Ethernet standard, whereby a known remote user interface (not shown) can interact with control unit 32.

Each operating device 10 of the type described above normally comprises a number of known work members (not shown in detail) which cooperate with one another to perform a given process in the formation of packets 2 of cigarettes. More specifically, the work members operate in respective work cycles which are repeated continually at a given speed derived directly from or synchronized with the speed of main electric motor 30 of packing machine 1.

In the course of its work cycle, each work member normally only interacts with the processing of packets 2 of cigarettes for a given length of time, and, for the rest of the cycle, is passive with substantially no effect on the processing of packets 2. More specifically, the work cycle of most work members is divided into an active portion, in which the work member interacts with the processing of a packet 2, and a passive portion, in which the work member does not interact with the processing of a packet 2 and stands by to interact with the processing of the next packet 2.

Some operating devices 10 have adjustable work members, each of which can be set to a number of different operating configurations to adjust, to a greater or lesser degree, the way in which it interacts with the processing of packets 2.

Each packet 2 has a number of characteristics, which must be adjustable by the operator to ensure packets 2 conform with given required standards, e.g. the position of collar 6 with respect to group 3 of cigarettes 4; flap overlap of blank 7 defining packet 2; and location of the gum spots (not shown) deposited on blanks 7 by gumming device 22.

By adjusting the operating configuration of certain adjustable work members, it is possible to adjust, either directly or indirectly, a corresponding characteristic of packets 2. More specifically, a change in the operating configuration of a work member may result in a direct change in at least one corresponding characteristic of packets 2 (e.g. the position of collar 6 with respect to blank 7), or in an indirect change in one or more characteristics of packets 2, by altering the overall efficiency/effectiveness of the process (e.g. increasing the temperature of the gum deposited by gumming devices 22, or adjusting the acceptance parameters of optical control devices 29).

During normal operation of automatic machine 1, i.e. with the work members of operating devices 10 performing the respective work cycles at substantially nominal operating speed, control unit 32 can be supplied by the operator, over interface device 34, with an adjust command to adjust the operating configuration of one or more adjustable work members. Such commands may be entered either directly, i.e. by the user requesting adjustment of the actual operating configuration, or indirectly, i.e. by the user requesting adjustment of a first characteristic of packets 2 (e.g. the position of collar 6 with respect to group 3 of cigarettes 4), from which control unit 32 derives a corresponding adjustment in the operating configuration of one or more work members.

On receiving the adjust command, control unit 32 determines, directly or indirectly, the adjustable work member involved (and, obviously, the operating device 10 it forms part of); determines, directly or indirectly, the current start configuration and the desired end configuration; and adjusts the configuration of the adjustable work member as the adjustable work member performs its work cycle, i.e. during normal operation of automatic machine 1.

In alternative embodiments, control unit 32 adjusts the configuration of an adjustable work member by acting on a known servoactuator (not shown) connected to and for setting and maintaining a given configuration of the adjustable work member, and/or by acting on the control parameters of the adjustable work member.

Adjustments to the configuration of an adjustable work member are preferably made when the adjustable work member is in a passive position, in which the work member has substantially no effect on the processing of a packet 2, and in which the adjustment to the configuration of the adjustable work member has no negative repercussions (typically tearing) on the materials (cigarettes 4, sheets 5 of packing material, collars 6, blanks 7) processed by the adjustable work member.

To avoid sharp adjustments which may cause problems in the processing of packets 2, the passage from a start to an end configuration is divided into a number of elementary adjustments of given amounts, only one of which is made in the course of a respective work cycle of the adjustable work member, so that adjustment of the work member configuration is spread over a number of successive work cycles.

In an alternative embodiment, when an adjust command is received, at least one packet 2 is identified as a transient reject packet 2, and the operating configuration of the adjustable work member is adjusted as the adjustable work member works directly or indirectly on the transient packet 2.

In a further embodiment, when an adjust command is received, material supply (cigarettes 4, sheets 5 of packing material, collars 6, blanks 7) for processing at least one packet 2 is cut off to temporarily interrupt the processing of packets 2, and the operating configuration of the adjustable work member is adjusted during the temporary interruption in which no packet 2 is processed by the work member.

Obviously, on receiving a user command to adjust the operating configuration of an adjustable work member, control unit 32 checks the adjustment is compatible with correct operation of packing machine 1, and, if it is not, does not perform the adjustment, and displays a corresponding user message on screen 35. To determine whether an adjust command is compatible with correct operation of packing machine 1, control unit 32 normally employs acceptance ranges memorized by the maker of packing machine 1, and may also employ a model of packing machine 1, or part of it, to simulate the effect of any adjust commands. In other words, before making an adjustment, control unit 32 determines the effect of the adjustment by means of a model simulating the behaviour of packing machine 1. And the simulation result may be displayed on screen 35 to obtain user confirmation in the light of the estimated effect of the adjustment.

A model is particularly useful, in that some adjustments may affect complex systems with numerous combinations of adjusted parameters and a validity range representing a limited subset of the explosion of all the acceptable value combinations of each.

Automatic machine 1 may comprise a switch device (not shown) forming part of control unit 32 and for detouring and feeding a given number of packets 2 from the production line to an operator check station. By activating the switch device, the operator can quickly and safely remove a number of packets 2 to check their characteristics and, therefore, the outcome of a previous command to adjust a given characteristic of packets 2.

In a preferred embodiment, adjust command entry by the user is subject to user identity and authorization recognition, which may be made by means of a password or key (mechanical, microprocessor, magnetic or optical) or using advanced identification techniques, such as fingerprint or other physical feature scanning.

As will be clear from the foregoing description, packing machine 1 need not be stopped to make any necessary adjustments, in particular to the characteristics of packets 2 produced on machine 1, thus increasing the output of machine 1 by eliminating the downtime involved in frequently adjusting the characteristics of packets 2 or the operation of packing machine 1.

Figure 3:
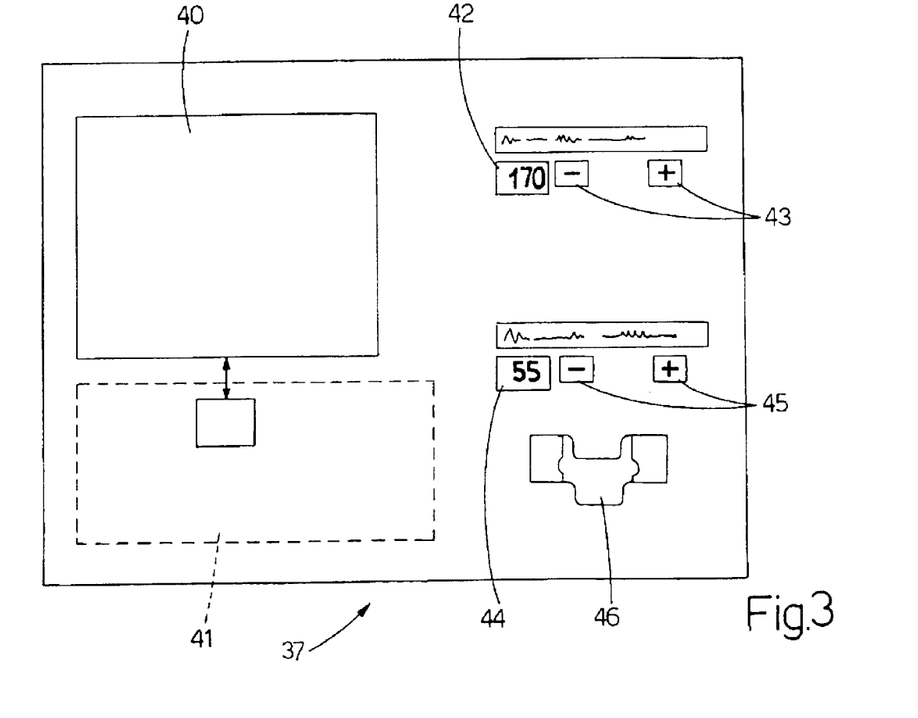
FIGS. 3, 4 and 5 show schematic screen displays on the FIG. 2 control unit.
Figure 4:
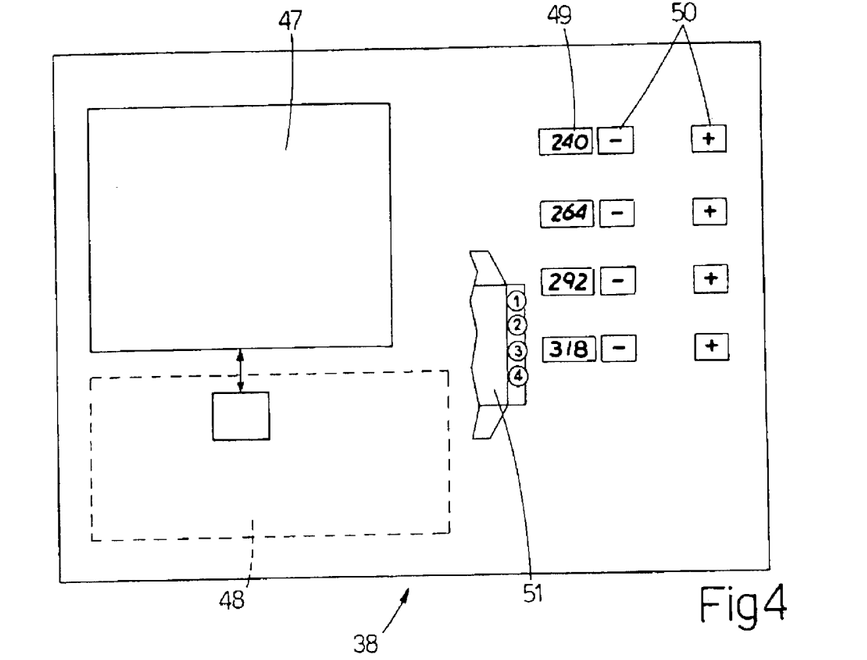
Figure 5:
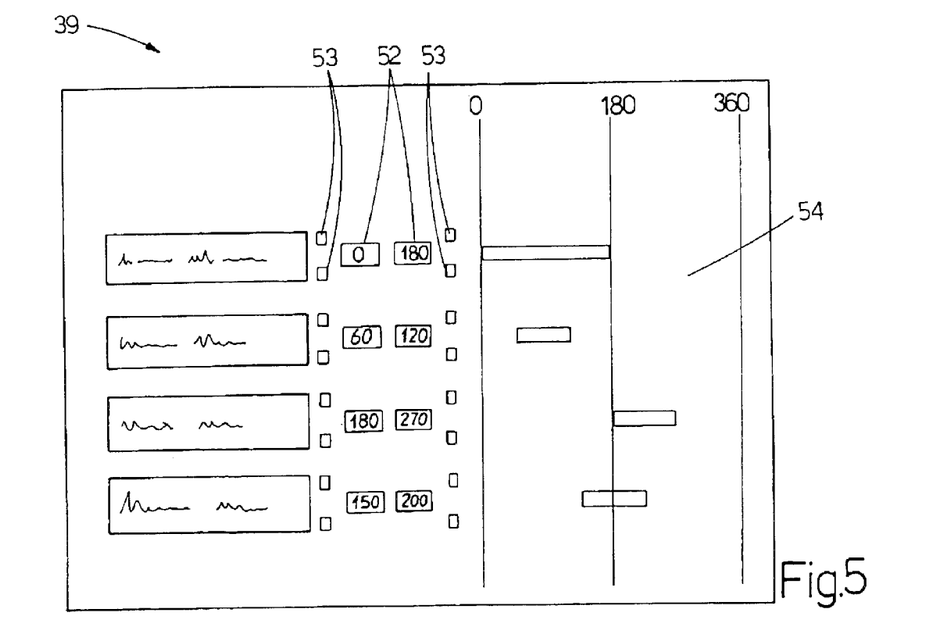

FIGS. 3, 4 and 5 show three examples of displays 37, 38 and 39 shown on screen 35 of user interface device 34 to allow the user to communicate to control unit 32 a direct or indirect request to adjust the configuration of an adjustable work member.

Display 37 in FIG. 3 allows the user to adjust the vertical and horizontal position of collars 6 with respect to blanks 7 by acting on the adjustable work members of supply wheel 20, and comprises an image 40 of supply wheel 20; a diagram 41 of packing machine 1 showing the position of supply wheel 20; a window 42 showing the current vertical position value of collars 6; two buttons 43 for adjusting the vertical position value of collars 6; a window 44 showing the current horizontal position value of collars 6; two buttons 45 for adjusting the horizontal position value of collars 6; and a diagram 46 showing, visually and in real time, the effect of changing the vertical and horizontal position of collars 6. Using display 37, the user obviously transmits to control unit 32 an indirect request to adjust the operating configuration of one or more adjustable work members, by requesting adjustment to a first characteristic of packets 2; and control unit 32 determines how the operating configuration of one or more adjustable work members is to be adjusted to adjust the first characteristic of packets 2 accordingly.

Display 38 in FIG. 4 allows the user to adjust the position of four spots of gum deposited on a flap of blank 7, by acting on the adjustable work members of gumming device 22, and comprises an image 47 of gumming device 22; a diagram 48 of packing machine 1 showing the position of gumming device 22; four windows 49 showing the current position value of the gum spots; four pairs of buttons 50 for adjusting the position value of the gum spots; and a diagram 51 showing, visually and in real time, the effect of adjusting the position of the gum spots. Using display 38, the user obviously transmits to control unit 32 an indirect request to adjust the operating configuration of one or more adjustable work members, by requesting adjustment to a first characteristic of packets 2; and control unit 32 determines how the operating configuration of one or more adjustable work members is to be adjusted to adjust the first characteristic of packets 2 accordingly.

An important point to note is the way in which diagrams 46 and 51 immediately show the user the effects of a given adjust command, so that adjustments to packing machine 1 can safely be made even by a not particularly experienced user.

Display 39 in FIG. 5 allows the user to adjust the angular position (expressed in machine degrees from 0 to 360) at which to activate and deactivate certain adjustable work members on packing wheel 21, and comprises four pairs of windows 52 showing the current angular position values; eight pairs of buttons 53 for adjusting the angular position values; and a diagram 54 showing the current angular position values. Using display 39, the user obviously transmits to control unit 32 a direct request to adjust the operating configuration of one or more adjustable work members, by entering information by which to adjust the actual operating configuration of a given adjustable work member.

Complex functions—such as cutting and centering material unwound off a reel, folding material, gum injection, ink-jet or laser printing, and laser piercing—are normally governed by complex control systems unaffected as far as possible by variations in the materials (cigarettes 4, sheets 5 of packing material, collars 6, blanks 7). On the basis of this principle, however, the control loop itself very often introduces errors due to differences between the expected mean characteristics and the real characteristics of the materials (cigarettes 4, sheets 5 of packing material, collars 6, blanks 7) currently being processed. To solve this problem, control unit 32 may independently acquire certain real characteristics of the materials (cigarettes 4, sheets 5 of packing material, collars 6, blanks 7) at the input and/or of packets 2 at the output, and opt to adjust the operating configuration of one or more adjustable work members accordingly. In this way, control unit 32 provides for real-time adapting the operating mode of packing machine 1 to actual current working conditions, thus improving the quality of packets 2, reducing stoppages caused by the machine interacting wrongly with the input materials (cigarettes 4, sheets 5 of packing material, collars 6, blanks 7), and so increasing output (by reducing both rejects and stoppages caused by jamming). To decide when, where and by how much to adjust the operating configuration of given adjustable work members, control unit 32 may employ models of packing machine 1, or part of it, designed to fairly accurately simulate the dynamic performance of the machine.

One such model, for example, may cover the chemical and physical gum characteristics, gum pressure adjustment parameters, and/or shutter opening control, and/or shutter travel, and/or nozzle hole size of gumming device 22. A system model showing the specific relationship between the electromechanical components and the physical parameters of the system provides, on the one hand, for automatically adjusting pressure to changing chemical and physical characteristics of the gum, and, on the other, for confirming proposed adjustments of specific parameters, shutter opening pulse time, and/or shutter travel, etc. in relation to the actual physical size of the spot map to be formed, spot size and/or spacing, and/or the overall size of the map and its location on the receiving material.

What is claimed is:

1. A method of controlling an automatic machine comprising a number of operating devices located along a production line for producing a succession of articles (2); some of the operating devices (10) comprising at least a relevant adjustable work member, which operates in a continually repeated work cycle and when activated can operate in a number of different operating configurations substantially independently from the other work members to adjust a relevant first characteristic of said articles (2); for each adjustable work member, each relevant operating configuration establishing the manner how the work member interacts with the articles (2); the method comprising the steps of receiving, during normal operation of the automatic machine (1), a command to adjust said first characteristic;

and adjusting the operating configuration of said adjustable work member without modifying the operating configuration of all the other work members to adjust said first characteristic of the articles (2) as the adjustable work member performs a following work cycle to process an article (2); the adjustment to the operating configuration of said adjustable work member comprising the passage from a start operating configuration to an end operating configuration different from the start operating configuration;

wherein the configuration of said adjustable work member is adjusted by acting on a servo actuator connected to and for setting and maintaining a given configuration of the adjustable work member; the operating configuration of said adjustable work member is not adjusted until the adjustable work member is set, in the course of its work cycle, to a passive position in which the adjustable work member does not substantially interact with the processing of a said article (2).

2. A method as claimed in claim 1, wherein said work cycle comprises an active portion in which said adjustable work member interacts with the processing of a said article (2), and a passive portion in which the adjustable work member does not substantially interact with the processing of a current article (2), and stands by to interact with the processing of a next article (2); the operating configuration of said adjustable work member not being adjusted until said adjustable work member is in said passive portion of the work cycle.

3. A method as claimed in claim 1, wherein adjustment to the operating configuration of said adjustable work member comprises the passage from a start operating configuration to an end operating configuration; the passage from the start operating configuration to the end operating configuration being divided into a number of elementary adjustments of given amounts to the operating configuration of the adjustable work member; and each said elementary adjustment being made in the course of a respective work cycle, so that only one said elementary adjustment is made at each work cycle.

4. A method as claimed in claim 1, wherein, when the command to adjust the operating configuration of said adjustable work member is received, at least one said article (2) is identified as a transient article (2) to be eliminated; the operating configuration of said adjustable work member being adjusted as the adjustable work member works on said transient article (2).

5. A method as claimed in claim 1, wherein a number of materials (4, 5, 6, 7) are supplied to process each said article (2); once the command to adjust the operating configuration of said adjustable work member is received, the supply of said materials (4, 5, 6, 7) for processing at least one article (2) being cut off to produce a temporary interruption in the processing of the articles (2); and the operating configuration of said adjustable work member being adjusted when no article (2) is worked on by the adjustable work member as a result of said temporary interruption.

6. A method as claimed in claim, 1, wherein, by request of a user and during normal operation of the automatic machine (1), a number of said articles (2) from said production line are detoured and fed to a user check station.

7. A method as claimed in claim 1, wherein, when said command to adjust the operating configuration of said adjustable work member is received, a check is made to determine compatibility of the command with correct operation of the automatic machine (1); said command not being performed if incompatible with correct operation of the automatic machine (1).

8. A method as claimed in claim 7, wherein previously memorized acceptance ranges are employed to determine whether said command to adjust the operating configuration of said adjustable work member is compatible with correct operation of the automatic machine (1).

9. A method as claimed in claim 7, wherein, to determine whether said command to adjust the operating configuration of said adjustable work member is compatible with correct operation of the automatic machine (1), the effect of the adjustment on the automatic machine (1) is simulated by means of a model of the automatic machine (1).

10. A method as claimed in claim 1, wherein said command to adjust the operating configuration of said adjustable work member is generated by a user by means of a user interface device 34).

11. A method as claimed in claim 10, wherein a screen (35) of said user interface device (34) graphically shows the effect produced on said articles (2) by said command to adjust the operating configuration of said adjustable work member.

12. A method of controlling an automatic machine comprising a number of operating devices located along a production line for producing a succession of articles (2); at least one operating device (10) comprising an adjustable work member, which operates in a continually repeated work cycle and can be set to a number of different operating configurations to adjust a first characteristic of said articles (2); the method comprising the steps of receiving, during normal operation of the automatic machine (1), a command to adjust said first characteristic; and adjusting the operating configuration of said adjustable work member to adjust said first characteristic of the articles (2) as the adjustable work member performs a work cycle to process are article (2); adjustment to the operating configuration of said adjustable work member comprising the passage from a start operating configuration to an end operating configuration; the passage from the start operating configuration to the end operating configuration being divided into a number of elementary adjustments of given amounts to the operating configuration of the adjustable work member; and each said elementary adjustment being made in the course of a respective work cycle, so that only one said elementary adjustment is made at each work cycle.

13. A method as claimed in claim 12, wherein, when the command to adjust the operating configuration of said adjustable work member is received, at least one said article (2) is identified as a transient article (2) to be eliminated; the operating configuration of said adjustable work member being adjusted as the adjustable work member works on said transient article (2).

14. A method as claimed in claim 12, wherein a number of materials (4, 5, 6, 7) are supplied to process each said article (2); once the command to adjust the operating configuration of said adjustable work member is received, the supply of said materials (4, 5, 6, 7) for processing at least one article (2) being cut off to produce a temporary interruption in the processing of the articles (2); and the operating configuration of said adjustable work member being adjusted when no article (2) is worked on by the adjustable work member as a result of said temporary interruption.

15. A method as claimed in claim 12, wherein, when said command to adjust the operating configuration of said adjustable work member is received, a check is made to determine compatibility of the command with correct operation of the automatic machine (1); said command not being performed if incompatible with correct operation of the automatic machine (1).

16. A method as claimed in claim 15, wherein previously memorized acceptance ranges are employed to determine whether said command to adjust the operating configuration of said adjustable work member is compatible with correct operation of the automatic machine (1).

17. A method as claimed in claim 15, wherein, to determine whether said command to adjust the operating configuration of said adjustable work member is compatible with correct operation of the automatic machine (1), the effect of the adjustment on the automatic machine (1) is simulated by means of a model of the automatic machine (1).

18. A method as claimed in claim 12, wherein said command to adjust the operating configuration of said adjustable work member is generated by a user by means of a user interface device (34).

19. A method as claimed in claim 18, wherein a screen (35) of said user interface device (34) graphically shows the effect produced on said articles (2) by said command to adjust the operating configuration of said adjustable work member.

20. A method of controlling an automatic machine comprising a number of operating devices located along a production line for producing a succession of articles (2); some of the operating devices (10) comprising at least a relevant adjustable work member, which operates in a continually repeated work cycle and when activated can operate in a number of different operating configurations substantially independently from the other work members to adjust a relevant first characteristic of said articles (2); for each adjustable work member, each relevant operating configuration establishing the manner how the work member interacts with the articles (2); the method comprising the steps of receiving, during normal operation of the automatic machine (1), a command to adjust said first characteristic;

and adjusting the operating configuration of said adjustable work member without modifying the operating configuration of all the other work members to adjust said first characteristic of the articles (2) as the adjustable work member performs a following work cycle to process an article (2); the adjustment to the operating configuration of said adjustable work member comprising the passage from a start operating configuration to an end operating configuration different from the start operating configuration;

when the command to adjust the operating configuration of said adjustable work member is received, at least one said article (2) is identified as a transient article (2) to be eliminated; the operating configuration of said adjustable work member being adjusted as the adjustable work member works on said transient article (2).

21. A method of controlling an automatic machine comprising a number of operating devices located along a production line for producing a succession of articles (2); some of the operating devices (10) comprising at least a relevant adjustable work member, which operates in a continually repeated work cycle and when activated can operate in a number of different operating configurations substantially independently from the other work members to adjust a relevant first characteristic of said articles (2); for each adjustable work member, each relevant operating configuration establishing the manner how the work member interacts with the articles (2); the method comprising the steps of receiving, during normal operation of the automatic machine (1), a command to adjust said first characteristic;

and adjusting the operating configuration of said adjustable work member without modifying the operating configuration of all the other work members to adjust said first characteristic of the articles (2) as the adjustable work member performs a following work cycle to process an article (2); the adjustment to the operating configuration of said adjustable work member comprising the passage from a start operating configuration to an end operating configuration different from the start operating configuration;

a number of materials (4, 5, 6, 7) are supplied to process each said article (2); once the command to adjust the operating configuration of said adjustable work member is received, the supply of said materials (4, 5, 6, 7) for processing at least one article (2) being cut off to produce a temporary interruption in the processing of the articles (2); and the operating configuration of said adjustable work member being adjusted when no article (2) is worked on by the adjustable work member as a result of said temporary interruption.

22. A method of controlling an automatic machine comprising a number of operating devices located along a production line for producing a succession of articles (2); some of the operating devices (10) comprising at least a relevant adjustable work member, which operates in a continually repeated work cycle and when activated can operate in a number of different operating configurations substantially independently from the other work members to adjust a relevant first characteristic of said articles (2); for each adjustable work member, each relevant operating configuration establishing the member how the work member interacts with the articles (2); the method comprising the steps of:

receiving, during normal operation of the automatic machine (1), a command to adjust said first characteristic;

and adjusting the operating configuration of said adjustable work member without modifying the operating configuration of all the other work members to adjust said first characteristic of the articles (2) as the adjustable work member performs a following work cycle to process an article (2); the adjustment to the operating configuration of said adjustable work member comprising the passage from a start operating configuration to an end operating configuration different from the start operating configuration; wherein, when said command to adjust the operating configuration of said adjustable work member is received, a check is made to determine compatibility of the command with correct operation of the automatic machine (1); said command not being performed if incompatible with correct operation of the automatic machine (1).

23. A method as claimed in claim 22, wherein previously memorized acceptance ranges are employed to determine whether said command to adjust the operating configuration of said adjustable work member is compatible with correct operation of the automatic machine (1).

24. A method as claimed in claim 22, wherein, to determine whether said command to adjust the operating configuration of said adjustable work member is compatible with correct operation of the automatic machine (1), the effect of the adjustment on the automatic machine (1) is simulated by means of a model of the automatic machine (1).

25. A method of controlling an automatic machine comprising a number of operating devices located along a production line for producing a succession of articles (2); some of the operating devices (10) comprising at least a relevant adjustable work member, which operates in a continually repeated work cycle and when activated can operate in a number of different operating configurations substantially independently from the other work members to adjust a relevant first characteristic of said articles (2); for each adjustable work member, each relevant operating configuration establishing the manner how the work member interacts with the articles (2); the method comprising the steps of receiving, during normal operation of the automatic machine (1), a command to adjust said first characteristic;

and adjusting the operating configuration of said adjustable work member without modifying the operating configuration of all the other work members to adjust said first characteristic of the articles (2) as the adjustable work member performs a following work cycle to process an article (2); the adjustment to the operating configuration of said adjustable work member comprising the passage from a start operating configuration to an end operating configuration different from the start operating configuration;

wherein said command to adjust the operating configuration of said adjustable work member is generated by a user by means of a user interface device (34); a screen (35) of said user interface device (34) graphically showing the effect produced on said articles (2) by said command to adjust the operating configuration of said adjustable work member.

26. A method of controlling an automatic machine comprising a number of operating devices located along a production line for producing a succession of articles (2); some of the operating devices (10) comprising at least a relevant adjustable work member, which operates in a continually repeated work cycle and when activated can operate in a number of different operating configurations substantially independently from the other work members to adjust a relevant first characteristic of said articles (2); for each adjustable work member, each relevant operating configuration establishing the manner how the work member interacts with the articles (2); the method comprising the steps of receiving, during normal operation of the automatic machine (1), a command to adjust said first characteristic from a user by means of a user interface device (34);

determining the adjustable work members involved with said first characteristic;

determining the current start configuration and the desired end configuration of each of the adjustable work members involved with said first characteristic;

and adjusting the operating configuration of each of the adjustable work members involved with said first characteristic without modifying the operating configuration of all the other work members to adjust said first characteristic of the articles (2) as each adjustable work member performs a following work cycle to process an article (2); the adjustment to the operating configuration of each said adjustable work member comprising the passage from a start operating configuration to an end operating configuration different from the start operating configuration.

27. A method as claimed in claim 26, wherein the operating configuration of said adjustable work member is not adjusted until the adjustable work member is set, in the course of its work cycle, to a passive position in which the adjustable work member does not substantially interact with the processing of a said article (2).

28. A method as claimed in claim 27, wherein said work cycle comprises an active portion in which said adjustable work member interacts with the processing of a said article (2), and a passive portion in which the adjustable work member does not substantially interact with the processing of a current article (2), and stands by to interact with the processing of a next article (2); the operating configuration of said adjustable work member not being adjusted until said adjustable work member is in said passive portion of the work cycle.

29. A method as claimed in claim 26, wherein adjustment to the operating configuration of said adjustable work member comprises the passage from a start operating configuration to an end operating configuration; the passage from the start operating configuration to the end operating configuration being divided into a number of elementary adjustments of given amounts to the operating configuration of the adjustable work member; and each said elementary adjustment being made in the course of a respective work cycle, so that only one said elementary adjustment is made at each work cycle.

30. A method as claimed in claim 26, wherein, when the command to adjust the operating configuration of said adjustable work member is received, at least one said article (2) is identified as a transient article (2) to be eliminated; the operating configuration of said adjustable work member being adjusted as the adjustable work member works on said transient article (2).

31. A method as claimed in claim 26, wherein a number of materials (4, 5, 6, 7) are supplied to process each said article (2); once the command to adjust the operating configuration of said adjustable work member is received, the supply of said materials (4, 5, 6, 7) for processing at least one article (2) being cut off to produce a temporary interruption in the processing of the articles (2); and the operating configuration of said adjustable work member being adjusted when no article (2) is worked on by the adjustable work member as a result of said temporary interruption.

32. A method as claimed in claim 26, wherein, when said command to adjust the operating configuration of said adjustable work member is received, a check is made to determine compatibility of the command with correct operation of the automatic machine (1); said command not being performed if incompatible with correct operation of the automatic machine (1).

33. A method as claimed in claim 32, wherein previously memorized acceptance ranges are employed to determine whether said command to adjust the operating configuration of said adjustable work member is compatible with correct operation of the automatic machine (1).

34. A method as claimed in claim 32, wherein, to determine whether said command to adjust the operating configuration of said adjustable work member is compatible with correct operation of the automatic machine (1), the effect of the adjustment on the automatic machine (1) is simulated by means of a model of the automatic machine (1).

* * * * *